July 23, 1957 S. L. MAJOR ET AL 2,800,336
HAND TRUCK
Filed Feb. 3, 1955
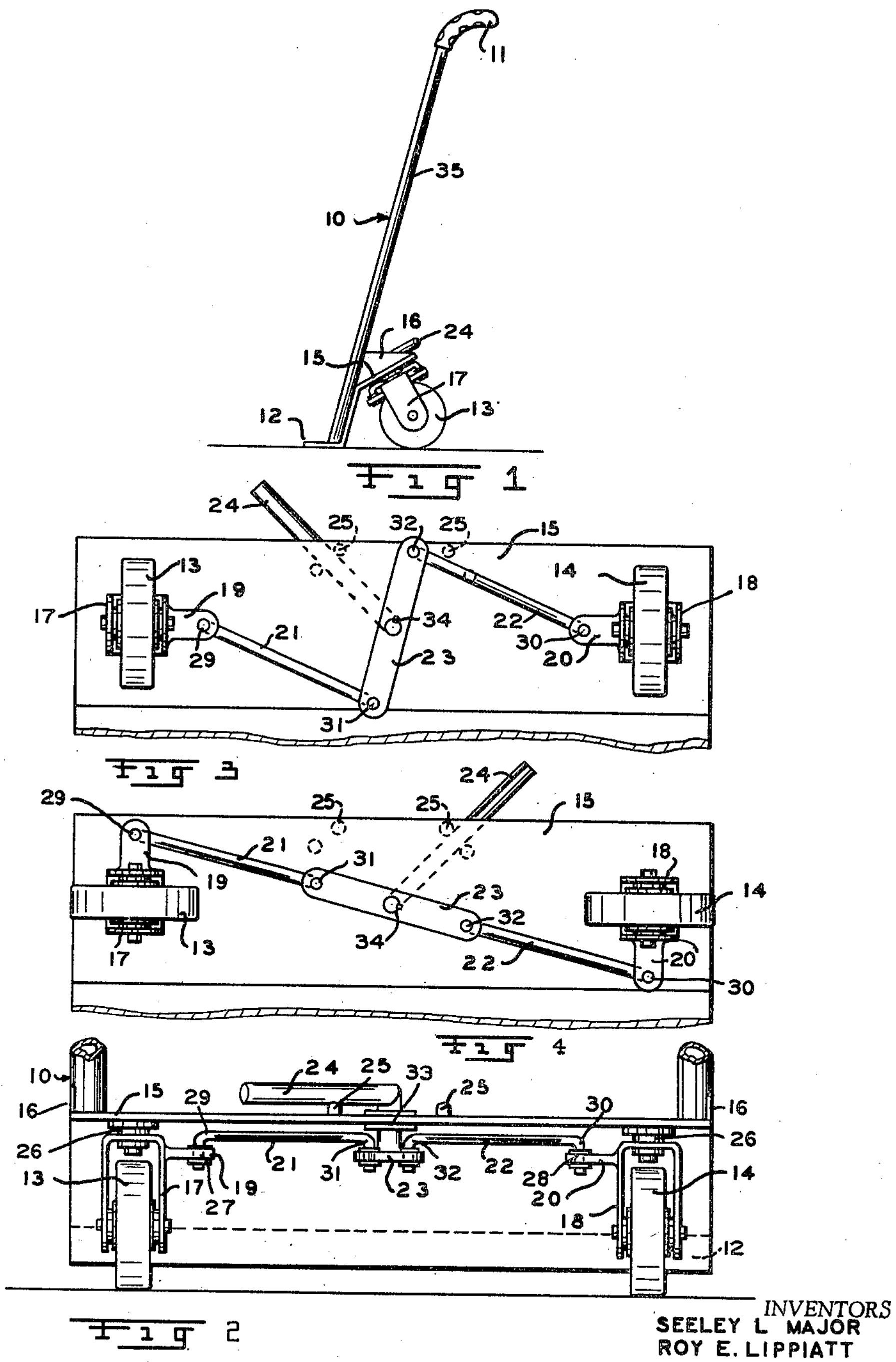
INVENTORS
SEELEY L MAJOR
ROY E. LIPPIATT
BY Francis J. Klempay
ATTORNEY United States Patent Office 2,800,336

Patented July 23, 1957

2,800,336

HAND TRUCK

Seeley L. Major, Canfield, and Roy E. Lippiatt, Salem, Ohio, assignors of one-third to John C. Holdgate, Courtland, Ohio Application February 3, 1955, Serial No. 485,845

2 Claims. (Cl. 280—47.11)

The present invention relates to portable carriers, known generally as hand trucks, and has particular reference to an improved hand truck adapted to facilitate the carrying of large and unusually shaped objects.

It is the primary object of the present invention to provide a hand truck of improved and simplified design which is adapted to receive and support articles for carriage and which is provided with means for manipulating the wheels thereof so as to facilitate the carriage of objects through restricted areas and openings.

Common hand trucks generally comprise a simple framework, supported by a pair of fixed wheels or casters and having manually engageable handles, whereby objects may be picked up upon the framework and moved from place to place while the weight of the object is supported upon the wheels. Often, in transporting oddly shaped articles, such as metal beams, pipes and the like, it is difficult if not impossible to manipulate the truck in close areas, due to the fact that the pipes or beams must be supported transversely to the direction of movement. Thus, it has been heretofore proposed to provide means on the truck to manipulate the wheels thereof, when necessary, so that elongated articles could be moved longitudinally through doorways and other restricted areas.

We have found, however, that the various prior art devices heretofore proposed have been objectionable as being complicated, unwieldy and/or expensive, and therefore not suitable or practical for general every-day use.

Accordingly, it is a specific object of our invention to provide a novel and improved hand truck assembly having means to manipulate the wheels thereof which is characterized by simplicity and practical rugged construction, rendering the complete assembly economical to manufacture and maintain and wholly suitable for general use.

Another object of the invention resides in the provision of a novel hand truck having means to manipulate the wheels thereof when and as desired wherein the means to maniplate the wheels is operable by the foot of a truck handler so that he may at all times maintain a firm grip upon the truck.

Yet another object of the invention is the provision of a hand truck having a simplified foot-operated mechanism for manipulating the wheels of the truck wherein the wheel manipulating mechanism is adapted to lock in a preset position.

The above and other objects and advantages of the invention will become apparent upon full consideration of the following detailed drawing and accompanying specification wherein is disclosed a certain preferred embodiment of the invention.

In the drawing:

Figure 1 is a side elevation of a hand truck constructed in accordance with the teachings of our invention.

Figure 2 is an enlarged fragmentary back elevation of a hand truck of Figure 1, illustrating our novel arrangement for mounting and manipulating the wheels of the truck; and Figures 3 and 4 are enlarged fragmentary bottom views of the hand truck of Figure 1, illustrating the manner of operation of our novel wheel operating or manipulating mechanism.

Referring now to the drawing, and initially to Figure 1 thereof, numeral 10 designates a framework structure of a hand truck, comprising a plurality of tubular members 35, for example, and having at the upper end thereof a pair of spaced handle grips 11. At the lower end of the framework 10 there is provided a lifting board 12 which is arranged to be slipped beneath an article or object to be transported upon the truck so that the article may be lifted into supported relation upon the framework 10 as the handles 11 are drawn downwardly.

Mounted behind the lifting board 12 are wheel assemblies 13 and 14 which are arranged upon a rearward tilting movement of the handles 11 to support the entire weight of the truck and any load supported thereby so that the latter may be freely transported from place to place.

In accordance with the teachings of the invention the wheel assemblies 13 and 14 are pivotally mounted at 26 with respect to the framework 10; and in the illustrated embodiment of the invention there is provided for the purpose of so mounting the wheels a platform 15 which extends rearwardly of the framework and which is an extension of a unitary sheet member which also forms the lifting board 12. The platform 15 is rigidly braced with respect to the framework 10 by members 16 provided for that purpose.

As clearly illustrated in Figures 2–4, the pivotally mounted wheel assemblies include pivotally mounted inverted U-shaped journal brackets 17 and 18, to the inside leg of which are welded or otherwise secured radially extending operating arms 19 and 20. The arms 19 and 20 are provided with vertical bores 27 and 28, respectively, which pivotally receive downwardly bent end outer portions 29 and 30, respectively, of connecting links 21 and 22.

At the inner ends of the connecting links 21 and 22 there are provided downwardly bent portions 31 and 32, respectively, which pivotally engage with a horizontally disposed control bar 23. The control bar 23 is rotatably mounted at 33 at the center of the platform 15, midway between the wheel assemblies 13 and 14, and is keyed at 34 to a control lever 24 which extends upwardly through the platform and then rearwardly of the truck in the manner shown.

Referring to Figures 3 and 4, it will be observed that when the operating arms 19 and 20 are inwardly directed and aligned the wheel assemblies 13 and 14 are in parallel forwardly directed relation so that the truck may be wheeled in a forwardly direction in the manner usually desired. At this time the control bar 23 is disposed almost transversely to the aligned axes of the operating arms 19 and 20. And in the preferred apparatus the control lever 24, at such time, is disposed at approximately forty-five degrees to the last mentioned aligned axes.

To lock the wheel assemblies in the above described position there are provided a plurality of studs 25 which extend upwardly from the upper surface of the platform 15 which releasably engage the control lever 24 with sufficient force to prevent undesired movements thereof caused by force applied through the wheel assemblies 13 and 14, but which permit ready manipulation of the control lever by the hand or foot of a truck handler.

Referring specifically to Figure 4, now, it will be observed that when the control lever 24 is moved through ninety degrees, the bar 23 acts through connecting links 21 and 22 to rotate the wheel assemblies ninety degrees from their initial position into alignment along an axis disposed transversely of the truck. Thus, the truck may move sideways, permitting elongated articles such as pipes, beams and the like to be conveniently transported through doorways and other restricted openings and areas. Of course, there are provided suitable locking studs 25 to releasingly engage the control lever in its second adjusted position. And, where desired, further locking studs, not specifically shown, may be provided to retain the lever 24 in one or more intermediate positions so that the truck may be advanced in an oblique manner if necessary or desirable.

It will be observed that in the arrangement of Figure 4, wherein the wheel assemblies 13 and 14 are aligned transversely of the truck frame, the connecting links 21 and 22 are aligned with control bar 23. In this manner the linkage is substantially self-locking, and turning forces applied through the wheel assemblies have no tendency to unseat the control lever 24. if desired the linkage may be rearranged by repositioning the arms 19 and 20 relative to wheel assemblies 13 and 14 to provide the self-locking condition when the wheel assemblies are oriented in other directions.

It should thus be apparent that we have accomplished the several objects initially set forth. We have provided an improved portable hand truck which incorporates a novel and highly simplified mechanism for manipulating the wheels of the truck so that the same may be readily controlled and guided through restricted areas and openings to facilitate the handling of objects of large size and/or unusual shape.

One of the important advantages of the invention resides in the fact that the control lever 24 for manipulating the wheel assemblies may be readily shifted by the foot of the truck handler, without impairing his grip upon the truck, while at the same time the wheel assemblies are substantially self-locking in one position against movement caused by forces imparted to the wheel assemblies during normal use of the truck.

In addition to the above advantages, our improved apparatus is of a highly simplified nature, and is therefore suitable for economical manufacture and use.

It should be understood, however, that the specific embodiment or form of the invention herein illustrated and described is intended to be illustrative only. Reference should therefore be had to the following appended claims in determining the full scope of the invention.

We claim:

1. A hand truck of the type comprising an upwardly extending load-supporting framework, a lifting board rigidly attached to the bottom end of said framework and extending forwardly thereof, a platform attached to and extending rearwardly of said framework in upwardly angled relation therewith, said platform being positioned above the bottom end of said framework, a pair of spaced wheel assemblies pivotally mounted on the underside of said platform adjacent the ends thereof, each of said wheel assemblies having a projecting arm with an aperture therethrough, an elongated control bar pivotally mounted at its center on said platform intermediate the ends thereof and having an aperture at each of its ends, connecting links joining said wheel assemblies with said control bar, each of said connecting links having a portion thereof extending through one of said apertures in said elongated control bar and another portion thereof extending through the aperture in one of said arms, said connecting links and said elongated control bar being positioned in aligned and self-locking relation with respect to each other when said wheel assemblies are in one operating position, and a control lever rigidly attached to said control bar and extending rearwardly of and beyond said platform whereby to be readily engageable by the foot of the hand truck operator for rotating said bar and thereby turn said wheel assemblies.

2. Apparatus according to claim 1 further including stud means on said platform for releasable engagement by said control lever in any one of a plurality of positions whereby said wheel assemblies may be releasably locked in predetermined positions.

References Cited in the file of this patent

UNITED STATES PATENTS

| | | |
|---|---|---|
| 638,331 | Grant | Dec. 5, 1899 |
| 690,449 | Martin | Jan. 7, 1902 |
| 2,235,043 | Ronning | Mar. 18, 1941 |